US007011524B1

(12) United States Patent
Oesterle, Jr.

(10) Patent No.: US 7,011,524 B1
(45) Date of Patent: Mar. 14, 2006

(54) METHOD AND APPARATUS FOR LEARNING WORD PRONUNCIATION AND SPELLING USING A TYPEABLE PHONETIC ALPABET

(76) Inventor: Kenneth C. Oesterle, Jr., 30170 Vassar St., Livonia, MI (US) 48152

( * ) Notice: Subject to any disclaimer, the term of this patent is extended or adjusted under 35 U.S.C. 154(b) by 181 days.

(21) Appl. No.: 09/991,404

(22) Filed: Nov. 16, 2001

(51) Int. Cl.
  *G09B 11/00* (2006.01)
(52) U.S. Cl. ..................................... 434/167; 434/159
(58) Field of Classification Search ........ 434/156–169, 434/308–321
See application file for complete search history.

(56) References Cited

U.S. PATENT DOCUMENTS

| | | | | |
|---|---|---|---|---|
| 4,833,610 A | * | 5/1989 | Zamora et al. | 434/167 |
| 4,884,972 A | * | 12/1989 | Gasper | 434/185 |
| 5,421,731 A | * | 6/1995 | Walker | 434/167 |
| 5,596,656 A | * | 1/1997 | Goldberg | 345/179 |
| 5,799,267 A | * | 8/1998 | Siegel | 434/169 |
| 5,953,692 A | * | 9/1999 | Siegel | 434/169 |
| 6,077,080 A | * | 6/2000 | Rai | 434/170 |

OTHER PUBLICATIONS

Crown, J. Conrad, "An alphabet for English-IV",Feb. 25, 2000, Indiana University-Purdue University at Indianapolis, pp. 2-15.*

Hieke, A.E., "Toward a Keyboard-Compatible English Phonetic Alphabet for ESL", 1992, University of Nevado, Reno.*

* cited by examiner

*Primary Examiner*—Kathleen Mosser
(74) *Attorney, Agent, or Firm*—Law Offices of John Chupa & Associates, P.C.

(57) ABSTRACT

A method for learning the orthographic spelling 112 of a word by finding the phonetic spelling 110 using a typeable phonetic alphabet 10 and referencing an alphabetical listing 100 of the phonetically spelled words 110 and their orthographic 112 equivalents.

1 Claim, 2 Drawing Sheets

"Unispell™" Chart Words for the Pronunciation Key 10

| | Vowel Bics | | | | Consonant Bics | | |
|---|---|---|---|---|---|---|---|
| | (5) Short | (5) Long | (5) Pair | Vowel Plus R Pattern | (18) Unigraph | | (5) Digraph (1)Trigraph |
| a~ | /A/ AT | /AE/ AET ATE | /AU/ AUTOE AUTO | /AR/ CAR | /B/ BIB | /N/ NOON | /CH/ CHURCH |
| b~ | /E/ ED | /EE/ EET EAT | /OI/ OIL | /ER/ CER CARE | /C/ CAEC CAKE | /P/ POP | /NG/ RING |
| c~ | /I/ IT | /IE/ IES ICE | /OO/ MOON | /IR/ IR EAR | /D/ DAD | /R/ ROR ROAR | /SH/ SHUSH |
| d~ | /O/ OCS OX | /OE/ GOE GO | /OU/ OUT | /OR/ OR | /F/ FIEF FIFE | /S/ SIS | /TH/ THAT |
| e~ | /U/ US | /UE/ UEZ USE | /UU/ BUUC BOOK | /UR/ TURN | /G/ GAG | /T/ TOT | /ZH/ ZHEEZHEE GIGI |
| f~ | | | | | /H/ HIT | /V/ VALV VALVE | /THH/ THHIN THIN |
| g~ | | | | | /J/ JUJ JUDGE | /W/ WET | |
| h~ | | | | | /L/ LILEE LILY | /Y/ YOE-YOE YO-YO | |
| i~ | | | | | /M/ MOM | /Z/ ZOOZ ZOOS | |

20 30 40 50 60 70 80

12  14  16

"Unispell™" Chart Words for the Pronunciation Key 10

| Vowel Bics | | | | Consonant Bics | | |
| --- | --- | --- | --- | --- | --- | --- |
| (5) Short | (5) Long | (5) Pair | Vowel Plus R Pattern | (18) Unigraph | | (5) Digraph (1) Trigraph |
| /A/ AT | /AE/ AET ATE | /AU/ AUTOE AUTO | /AR/ CAR | /B/ BIB | /N/ NOON | /CH/ CHURCH |
| /E/ ED | /EE/ EET EAT | /OI/ OIL | /ER/ CER CARE | /C/ CAEC CAKE | /P/ POP | /NG/ RING |
| /I/ IT | /IE/ IES ICE | /OO/ MOON | /IR/ IR EAR | /D/ DAD | /R/ ROR ROAR | /SH/ SHUSH |
| /O/ OCS OX | /OE/ GOE GO | /OU/ OUT | /OR/ OR | /F/ FIEF FIFE | /S/ SIS | /TH/ THAT |
| /U/ US | /UE/ UEZ USE | /UU/ BUUC BOOK | /UR/ TURN | /G/ GAG | /T/ TOT | /ZH/ ZHEEZHEE GIGI |
|  |  |  |  | /H/ HIT | /V/ VALV VALVE | /THH/ THHIN THIN |
|  |  |  |  | /J/ JUJ JUDGE | /W/ WET |  |
|  |  |  |  | /L/ LILEE LILY | /Y/ YOE-YOE YO-YO |  |
|  |  |  |  | /M/ MOM | /Z/ ZOOZ ZOOS |  |
| 20 | 30 | 40 | 50 | 60 | 70 | 80 |

12 · 14 · 16

Figure 1 athhleet          3                    bac

| /a/ at | /ee/ eat, ate | /oi/ outoe, auto | /ar/ car | /b/ bib | /n/ noon | /ch/ church |
|---|---|---|---|---|---|---|
| /e/ Ed | /ea/ eat, eat | /oi/ oil | /ar/ ear, care | /c/ case, cake | /p/ pop | /ng/ ring |
| /i/ it | /ie/ ies, ice | /oo/ moon | /r/ ir, ear | /d/ dad | /r/ ror, roar | /zh/ shush |
| /o/ oss, ox | /oa/ goe, go | /ou/ out | /or/ or | /f/ fisf, fife | /s/ sis | /th/ that |
| /u/ us | /ue/ uez, use | /uu/ buuc, book | /ur/ turn | /g/ gog | /t/ tot | /zh/Zhuuzhes, Gigi |
|  |  |  |  | /h/ hit | /v/ valv, valve | /thh/thhin, thin |
|  |  |  |  | /j/ juj, judge | /w/ wet |  |
|  |  |  |  | /l/ lilee, lily | /y/ yoe-yoe, yo-yo |  |
|  |  |  |  | /m/ mom | /z/ zooz, zoos |  |

102 ↓    104 ↓         106 ↗

- athhleet    athlete
- atutood     attitude
- auf         off
- auful       awful
- aufun       often
- aufur       offer ─ 112
- Aug.        Aug.
- August      August
- aul         all
- aulmoest    almost
- aulredee    already
- aul riet    all right
- aulsoe      also
- aulthoe     although ─ 112
- aulwaez     always ─── DEFINITION of the word "Always"
- aut         ought        DEFINITION of the word "Ought"
- authhur     author
- autoe       auto
- autum       autumn
- autumoebeel automobile
- Av.         Ave.
- avunoo      avenue
- az          as
- bac         back 110    100    108 ↓

Figure 2

METHOD AND APPARATUS FOR LEARNING WORD PRONUNCIATION AND SPELLING USING A TYPEABLE PHONETIC ALPABET

FIELD OF THE INVENTION

The present invention generally relates to a method for learning the pronunciation and spelling of a word and more particularly, to a method for learning the pronunciation and spelling of a word by using a typeable phonetic alphabet.

BACKGROUND OF THE INVENTION

Spoken languages, such as the English language, are traditionally first learned by hearing and speaking and are then learned in writing (i.e., how to read and spell a particular word). The transition from learning a word orally (and aurally) to learning how to read and spell that word is often difficult for individuals first becoming acquainted to that particular language (e.g., children or individuals learning a foreign language). This transition is particularly difficult within the English language due to the wide variety of word origins (e.g., Latin, Greek, or French) that effect the pronunciation and spelling of various words. The inherent intricacies required in traditional orthography (i.e., how words are spelled) traditionally require learning how to spell or read words by rote or repetition or by memorizing confusing "rules" that include numerous exceptions or errors (e.g., "i" before "ee", except after "c" . . . ). Learning to spell, read, and pronounce words in this manner is often difficult, time consuming, and frustrating.

Attempts have been made to devise phonetic learning systems, or "phonics", which associate the sound components of a word with graphic symbols or pictures. While these systems do provide a relatively easy way to learn the component sounds that make up words, they do not teach how the associated word is spelled in traditional orthography. Other systems rely on diacritical markings or symbols which are added to letters to represent a certain sound (e.g., the "ā" symbol used to represent the "long a" sound).

While these current systems do effectively permit a user to "sound out" or pronounce a particular word, they do not permit a user to readily type the words phonetically using a conventional typewriter/keyboard. With the increasing prevalence of computer based teaching and learning techniques, it is important to be able to type a word phonetically in order to further facilitate learning using all of the tools available in these modern times. By using graphic symbols and/or diacritical markings which are not readily typeable on a conventional keyboard, however, the current phonetic systems cannot take advantage of all the teaching/learning tools available today.

Additionally, traditional dictionaries are often the source utilized in determining the correct orthographic spelling of a particular word. These dictionaries are formatted and ordered in a manner (i.e., alphabetically) which presents the orthographic spelling of a word followed by the phonetic spelling, using diacritical markings, to aid in pronouncing the word. These dictionaries, however, cannot assist a user who is attempting to orthographically spell a word while only knowing the pronunciation of the word (i.e., only knows the phonetic spelling of the word).

There is therefore a need for a new and improved method and apparatus which overcomes at least some of the previously delineated drawbacks of prior phonetic alphabets and systems, which provides a typeable phonetic alphabet and is assembled in a manner which first arranges words phonetically and then provides the orthographic spelling, thereby permitting a user to easily learn the orthographic spelling of a word based only upon the pronunciation of that word.

SUMMARY OF THE INVENTION

It is a first advantage of the present invention to provide a method and apparatus which overcomes at least some of the previously delineated drawbacks of prior phonetic systems and methodologies.

It is a second advantage of the present invention to provide a method and apparatus which overcomes at least some of the previously delineated drawbacks of prior phonetic systems and which, by way of example and without limitation, provides a typeable phonetic alphabet.

It is a third advantage of the present invention to provide a method and apparatus which overcomes at least some of the previously delineated drawbacks of prior phonetic systems and which, by way of example and without limitation, provides a dictionary that is formatted and arranged using a typeable phonetic alphabet.

According to a first aspect of the present invention a method for typing a word using a phonetic alphabet is provided. The method comprises the steps of providing a plurality of bics, wherein the plurality of bics are comprised of typeable letters and combined typeable letters; and combining at least one of the plurality of bics to phonetically spell the word.

According to a second aspect of the present invention a method for learning the orthographic spelling of a word is provided. The method comprises the steps of providing a typeable phonetic alphabet; phonetically spelling the word using the typeable phonetic alphabet; and comparing and contrasting the typeable phonetic spelling with the orthographic spelling of the word.

According to a third aspect of the present invention a method for determining an orthographic spelling and definition of a word based upon a pronunciation of the word is provided. The method comprises the steps of providing a typeable phonetic alphabet; and providing a dictionary which is arranged based upon the typeable phonetic alphabet.

These and other features, aspects, and advantages of the present invention will become apparent from a reading of the following detailed description of the preferred embodiment of the invention and by reference to the following drawings.

BRIEF DESCRIPTION OF THE DRAWINGS

FIG. 1 is a pronunciation key showing forty-four sounds which make up those commonly used in the American-English language and the thirty-nine bics which represent these sounds.

FIG. 2 is an alphabetically arranged listing of the phonetic spelling of commonly used American-English words and their orthographically spelled equivalents.

DETAILED DESCRIPTION OF THE PREFERRED EMBODIMENT OF THE INVENTION

Referring now to FIG. 1 there is shown a typeable phonetic alphabet pronunciation key 10, which is made in accordance with the teachings of the preferred embodiment of the invention, depicting the forty-four speech sounds commonly used in the American-English language (i.e., the dialect of the English language that is spoken within the United States). Pronunciation key 10 has a plurality of rows "a–i" and columns 20–80 which divide the key 10 into a plurality of cells that are formed by the intersection of these rows and columns (e.g. cell 20a is found at the intersection of column 20 with row "a"). Each cell includes a representative letter or combination of letters or "bic" that is depicted surrounded within a pair of "slash marks". For example, the bic AE is found in cell 30a and is shown in the pronunciation key 10 as /AE/. Further, each cell includes a simple example of the sound each bic represents (e.g., cell 30a includes the word "ATE" to show what the bic /AE/ sounds like). As will be described later, each of the forty-four sounds are represented by thirty-nine bics in pronunciation key 10 and may be combined to form any of the commonly used words in the American-English language. Importantly, it should be noted that all of the thirty-nine bics depicted in pronunciation key 10 are composed of Roman letters which are found upon a standard English typewriter/keyboard and do not require any special symbols or modifiers and are therefore easily typeable.

Pronunciation key 10 is further divided into distinct portions 12, 14, and 16 which respectively represent the fifteen vowel sound bics, the five "vowel plus r" sound patterns, and the twenty-four consonant sound bics.

Vowel sound bics in portion 12 are comprised within columns 20–40. There are three classifications of vowel bics: five "short", five "long", and five "pair" vowel bics.

Column 20 includes the five "short" sounds or bics for the vowels. As shown in pronunciation key 10, each of the bics used to represent the short sounds for the vowels uses that particular letter alone For example, cell 20c depicts that the bic sound for the letter "i" heard in the word "it" is simply the short bic /i/. Following this typeable phonetic alphabet 10, any time a vowel is found that is "standing alone" (i.e., not followed by another vowel) a user immediately should recognize that the "short" sound of the vowel is intended.

Column 30 includes the five "long" sounds for the vowels. Each of the bics for the long vowels are represented by that particular vowel followed by the letter "e". For example, cell 30d comprises the bic /OE/, this bic represents the long "o" sound heard in the word "go". Following this typeable phonetic alphabet 10, any time a vowel is found that is followed by the letter "e" a user immediately should recognize that the "long" sound of the vowel preceding the "e" is intended. That is, long vowel bics are always spelled with two vowel letters, the second one always being an "e".

Column 40 includes the five vowel sounds that are neither "short" nor "long", but are common variations of some of the vowel sounds. As shown in pronunciation key 10, each of these "pair" vowel bics are represented by two vowels. To differentiate the "pair" vowels from the "long" vowels, none of the pair vowels are followed by the letter "e". That is, pair bics are always spelled with two vowel letters, but neither of the letters is the letter "e".

Portion 14 of pronunciation key 10 includes a column 50 which is comprised of bics that represent the manner in which the letter "r" modifies the sound of the various vowels. These "vowel plus r" patterns are always spelled with a single vowel followed by the letter "r". Examples of what sounds these sound patterns represent are provided in column 50 of pronunciation key 10. For example, cell 50c demonstrates how the letter "r" modifies the vowel "i" to create the "vowel plus r" pattern /IR/. Cell 50c further shows that pattern /IR/ is pronounced like the word "EAR".

Pronunciation key 10 further comprises portion 16 which includes consonant sound bics which are comprised within columns 60–80. The consonant sound bics are divided into three classifications: eighteen "unigraph", five "digraph", and one "trigraph" consonant bics.

Columns 60 and 70 include the eighteen unigraph consonant bics. These unigraph consonant bics are always represented by a single consonant letter. It should be noted that most of the consonants within the standard English alphabet are represented by a unigraph consonant bic, but certain letters (namely "k", "q", and "x") do not have bics. This is because the sounds created by each of these letters may be duplicated by another bic (e.g., the letter "k" has the same sound as the bic "c"). As shown in pronunciation key 10, an example of the representative sound for each consonant bic is included within each cell.

Column 80 includes the five "digraph" and one "trigraph" bic used within the American-English language. As shown in pronunciation key 10 of FIG. 1, each of the five digraph consonant bics are always spelled with a single consonant and the letter "h", except for the "ng" bic. Additionally, one "trigraph" consonant bic "thh" is included in column 80 and is spelled with the consonant "t" followed by the letter "h" twice. The pronunciation key 10 has a simple pronunciation example provided within each cell of column 80 to aid in differentiating between the sounds of the digraph and trigraph bics and the unigraph bics.

By combining or "stringing" the thirty-nine typeable phonetic alphabet bics and the five "vowel plus r" patterns together a user can construct any word in the American-English language that is heard or pronounced by the user into a typeable phonetic spelling. Most words in the American-English language, however, are not orthographically spelled the same as they would be phonetically spelled using the above typeable phonetic alphabet.

Referring now to FIG. 2, in operation a listing 100 is provided having a first column 102 of alphabetically arranged words 110 spelled using the typeable phonetic alphabet 10. Listing 100 also includes a second column 104 of orthographically spelled words 112 which correspond to the alphabetically arranged phonetically spelled word 110. As shown in FIG. 2, column 104 is disposed in close proximity to the column 102 to permit a user to relatively easily reference the correct orthographic spelling of a word. Importantly, listing 100 may be arranged alphabetically due to the typeable nature of the phonetic alphabet employed. This provides the added advantage over prior phonetic alphabets in that a phonetically spelled word using a typeable phonetic alphabet permits a user to quickly and intuitively find the orthographic spelling of a word because the user only needs to know the standard "Roman letter" alphabet and does not need to learn how to "alphabetize" or arrange the symbols and markings used in other non-typeable phonetic alphabets. For example and without limitation, a user does not need to know whether the $\bar{a}$ symbol is alphabetically before or after the $\breve{a}$ symbol in order to reference a word.

In one nonlimiting embodiment of the invention, as is further shown in FIG. 2, listing 100 may further include the definition 108 of the orthographically spelled word 112. In this nonlimiting embodiment, listing 100 may be compiled into a pronunciation dictionary which would permit a user to hear a word, spell the word phonetically 110 using the typeable phonetic alphabet, find the orthographic spelling 112 of the word, and "look up" the definition 116 of the word.

In another nonlimiting embodiment, the definition 108 may be in a language different than the language of the word 110 "looked up". For example and without limitation, a visitor from a different country (e.g., Germany) who may not understand English may employ the listing/dictionary 100 to determine exactly what an American is saying by phonetically spelling the American-English word and then finding the definition or equivalent word listed in German and vice versa for the American.

In one nonlimiting embodiment, a user can learn to orthographically spell a desired word by first phonetically spelling the word after hearing it using the typeable phonetic alphabet described in pronunciation key 10. The user then "looks up" the phonetically spelled word 110 using alphabetical listing 100 in order to reference column 104 which depicts the correct orthographic spelling 112 of the desired word. After finding the orthographically spelled word 112, the user can compare and contrast the differences between the phonetically spelled word 110 and the orthographically spelled word 112 and will be able to employ conventional learning and memorization techniques to associate a given orthographic spelling with the typeable phonetic spelling of the word. For example and without limitation, a user could employ memory pictures and clues to associate letters that are commonly combined orthographically such as "ph" to the phonetic /f/ sound bic in order to mentally recognize that "ph equals f" when orthographically spelling certain words.

It is to be understood that the invention is not limited to the exact construction or method which has been previously delineated, but that various changes and modifications may be made without departing from the spirit and the scope of the inventions as are set forth in the following claims. The above disclosure uses the American-English language and its associated thirty-nine bics and five "vowel plus r" patterns for exemplary purposes only and other languages which may or may not require additional bics for certain sounds unique to that particular language are intended. Additional bics may be created for these sounds using any unused combination of typeable vowel or consonant combinations. For example and without limitation, the German sound found at the end of "Bach" could be represented by a single consonant unigraph bic "k" (i.e., the phonetic spelling of Bach could be "Bok"), which is not used in the American-English phonetic alphabet 10 discussed above.

What is claimed is:

1. A method for learning the orthographic spelling of a word comprising the steps of:

creating a typeable phonetic alphabet pronunciation key comprising:

a plurality of rows and a plurality of columns which cooperatively divide the key into a plurality of cells which are respectively formed by the intersection of said plurality of rows and said plurality of columns wherein each of said cells includes one of a representation letter and a combination of letters which respectively form a bic and wherein said key includes only forty four unique bics and wherein each of said forty four unique bics are used to form and represent only forty four sounds and wherein each of said bics are composed only of Conventional Roman letters which are typically deployed upon a conventional English typewriter, wherein said pronunciation key being further divided into three distinct portions which each respectively include a first set of said bics which only represents vowel sounds, a second set of said bics which only represent vowel plus R sounds, and a third set of said bics which only represents consonant sounds and wherein said first of said, three distinct portions includes only three classifications of said vowel sounds, wherein a first of said classifications only includes a short sound, a second of said classifications only includes a long sound, and a third of said classifications only includes a vowel pair and wherein said second of said three distinct portions is arranged in a column and wherein said third of said three distinct portions includes a first unigraph bic portion that only has eighteen bics, a second digraph bic portion that only has five bics, and a third trigraph portion that only has a single bic and wherein said typeable phonetic alphabet pronunciation key includes a listing having a first column of alphabetically arranged words which are each spelled using the typeable phonetic alphabet and a second column of orthographical spelled words which is disposed in close proximity to said first column;

hearing said word;

phonetically spelling said word after hearing said word using the typeable phonetic alphabet pronunciation key;

by alphabetical order, finding said orthographically spelled word, within said listing; and comparing said found orthographically spelled word with said phonetically spelled word and associating, by memory, said orthographically spelled word with said phonetically spelled word, thereby facilitating learning the orthographic spelling of said word.

* * * * *